(12) United States Patent
Kress et al.

(10) Patent No.: US 6,872,035 B2
(45) Date of Patent: Mar. 29, 2005

(54) MACHINING TOOL

(75) Inventors: Dieter Kress, Aalen (DE); Rudolf Strom, Vaihingen/Enz (DE)

(73) Assignee: MAPAL Fabrik für Präzisionswerkzeuge Dr. Kress KG, Aalen (DE)

( * ) Notice: Subject to any disclaimer, the term of this patent is extended or adjusted under 35 U.S.C. 154(b) by 200 days.

(21) Appl. No.: 10/210,402

(22) Filed: Aug. 1, 2002

(65) Prior Publication Data

US 2003/0039521 A1 Feb. 27, 2003

(30) Foreign Application Priority Data

Aug. 2, 2001 (DE) ......................................... 101 38 945

(51) Int. Cl.$^7$ ............................................. B23B 51/02
(52) U.S. Cl. .................... 408/1 R; 408/227; 408/83; 408/188; 408/233; 408/713
(58) Field of Search ............................ 408/1 R, 79, 80, 408/81, 83, 187, 188, 227, 229, 231, 233, 713, 230

(56) References Cited

U.S. PATENT DOCUMENTS

| | | | | |
|---|---|---|---|---|
| 3,977,807 A | * | 8/1976 | Siddall | ........................ 408/223 |
| 4,225,274 A | * | 9/1980 | Katz | ........................ 408/225 |
| 4,425,063 A | | 1/1984 | Striegl | |
| 5,049,011 A | * | 9/1991 | Bohnet et al. | ............... 408/223 |
| 5,328,304 A | * | 7/1994 | Kress et al. | ................... 408/83 |
| 6,109,838 A | * | 8/2000 | Riviere | ......................... 407/36 |
| 6,354,773 B1 | * | 3/2002 | Konen | ......................... 408/213 |
| 6,551,036 B2 | * | 4/2003 | Heule | .......................... 408/227 |
| 6,685,402 B2 | * | 2/2004 | Mast et al. | .................. 408/227 |
| 2003/0012613 A1 | * | 1/2003 | Takiguchi et al. | ........... 408/230 |
| 2003/0053872 A1 | * | 3/2003 | Schlagenhauf | .............. 408/184 |

FOREIGN PATENT DOCUMENTS

| | | |
|---|---|---|
| DE | DBP 1 057 414 | 5/1959 |
| DE | 35 20 179 C2 | 12/1986 |
| DE | 198 06 864 | 8/1999 |
| DE | 299 20 573 U1 | 5/2000 |
| GB | 189758 | 2/1923 |
| JP | 60090623 | 5/1985 |
| JP | 11207509 A * | 8/1999 ........... B23B/51/00 |

* cited by examiner

Primary Examiner—Daniel W. Howell
(74) Attorney, Agent, or Firm—Morriss O'Bryant Compagni

(57) ABSTRACT

A machining tool for bores in thin-walled work pieces with at least one cutting plate is recommended that is characterized in that the at least one cutting plate (9, 9', 9"; 9a, 9'a) is inserted into the circumference surface (15) of the tool (1) in such a way that two viewed in pivot direction—guide surfaces (31, 33) arranged at a distance to one another are present, which serve as a support of the tool (1) at the machining work piece surface.

21 Claims, 3 Drawing Sheets

MACHINING TOOL

DESCRIPTION

The invention relates to a machining tool for the boring into work pieces with at least one cutting plate. Tools of this type are known. Vibrations, particularly in the machining of bores in very thin-walled assembly units often occur, so that the quality of the machined surface is often of inferior quality. The vibrations also occur at slow work rates, that is, with low cutting depths, and with a relatively slow feed rate.

It is therefore the task of this invention to create a tool of the previously mentioned type that does not have these disadvantages.

In order to solve this task, a tool is recommended, that has the characteristics mentioned in claim 1. It is characterized by the fact that the at least one cutting plate is inserted into the circumference surface of the tool in such a way that two guide surfaces arranged at a distance to one another are present with the machining of a work piece, which serve as a support of the tool at the machining work piece surface. The guide surfaces are intended at a distance to one another on the cutting plate, and are positioned—viewed in the direction of rotation—behind one another. Due to the fact that the forces occurring during the machining of the work piece are supported by means of the guide surfaces, vibrations can be avoided even at higher work rates.

Particularly preferred is an example of an embodiment of the tool that is characterized by the fact that the cutting p late has at least one cutting edge with a positive grind. This embodiment ensures that lower cutting forces occur at the cutting edge. This also avoids, or at least reduces vibrations in the machining of bores, particularly in thin-walled assembly units.

Further embodiments result from the other sub-claims.

Figure 1:
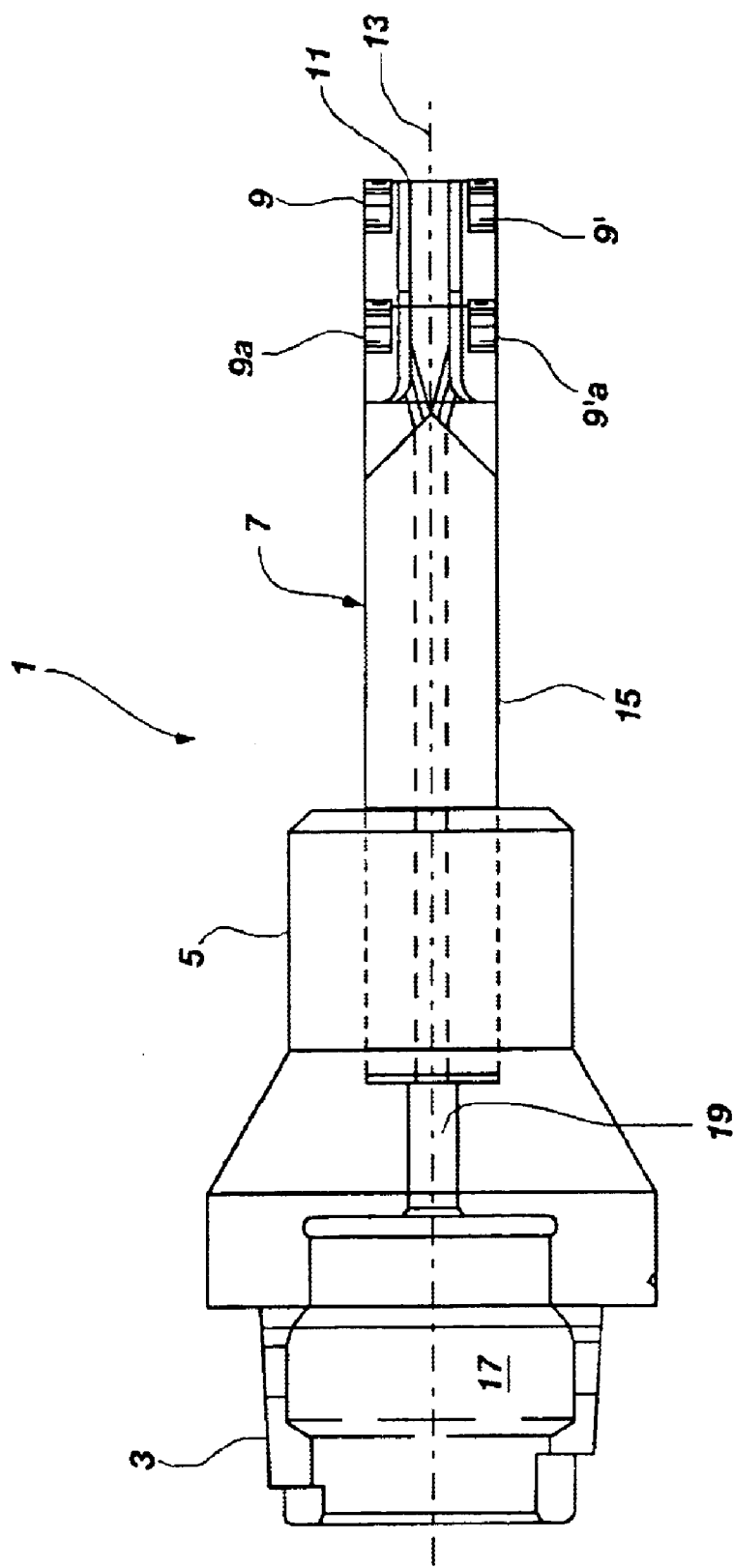
Figure 2:
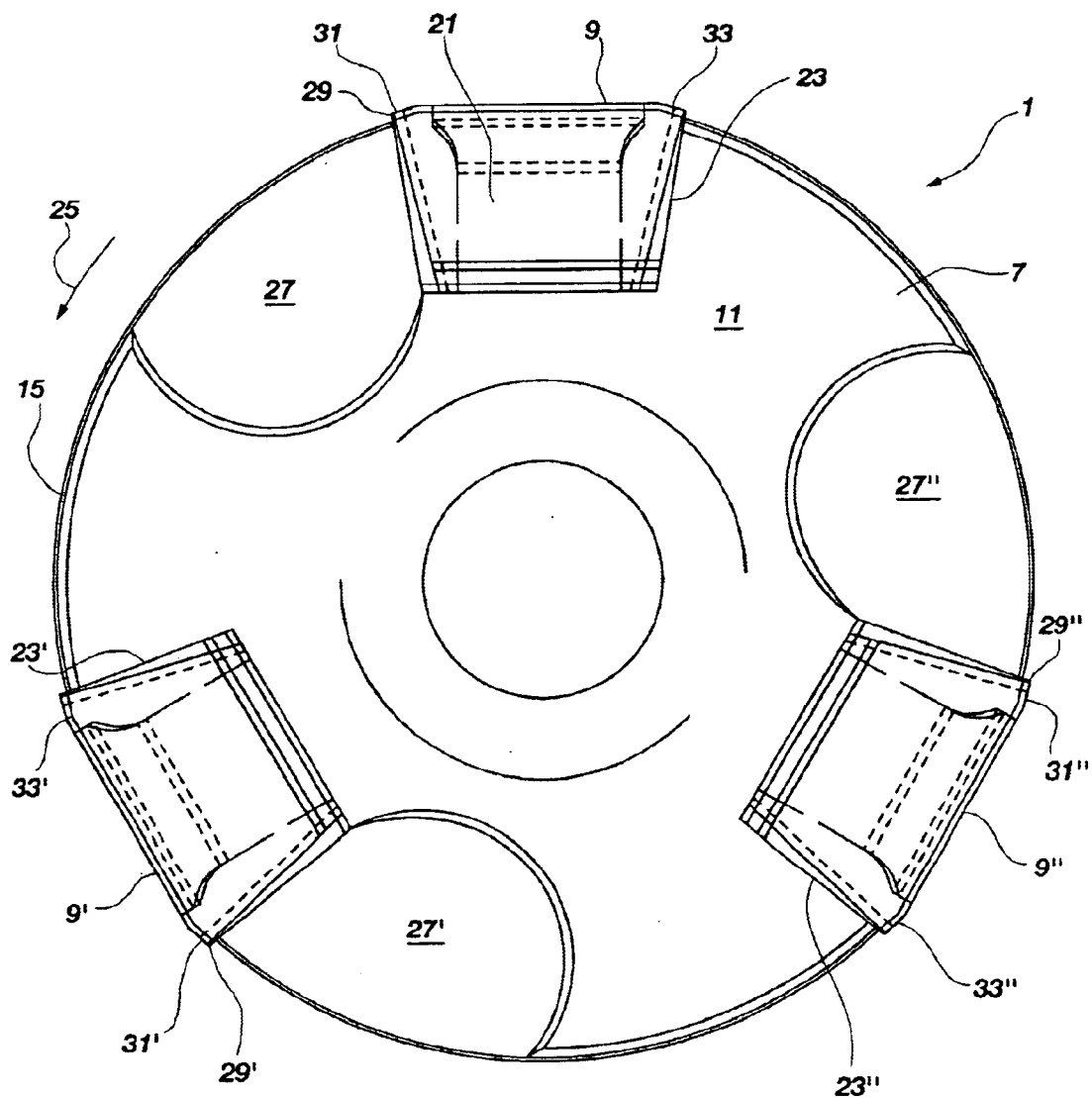
Figure 3:
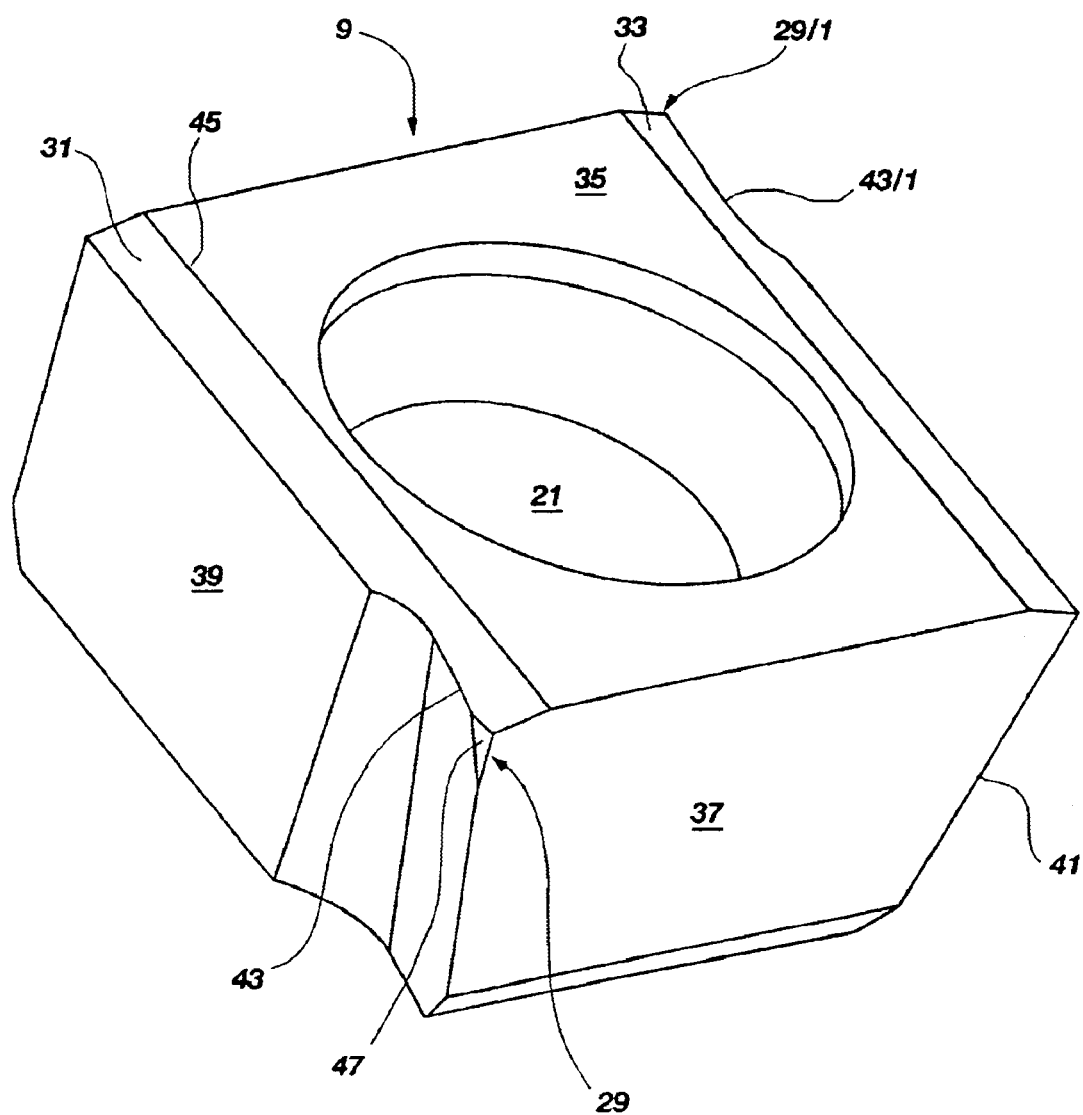

The invention is explained in detail according to the following drawings. They show:

FIG. 1 a principle drawing of a side view of a tool;

FIG. 2 a greatly enlarged view of the front of the tool illustrated in FIG. 1, and FIG. 3 a perspective view of a cutting plate greatly enlarged.

The tool 1 illustrated in FIG. 1 is comprised of a common shaft 3, which is part of a tool holder 5. A tool insert 7 is placed in it, such as shrunk in, or attached in another way. The tool holder 5 and the tool insert 7 can also consist of one piece. The tool 1 is coupled to a tooling machine by means of the shaft 3 in a common way.

At least one cutting plate 9 is intended on the free end of the tool insert 7 that is opposite of the tool 5. In the example illustrated here, two opposing cutting plates 9 and 9' are intended near an end 11 of the tool insert. Additional cutting plates 9a and 9'a are intended at a distance to these cutting plates 9 and 9' measured in the direction of a pivot axis 13. The example of the tool 1 illustrated here therefore has a first group of cutting plates 9, 9' in the direct vicinity of the end 11 on the assumed ring surface, and a second group of cutting plates 9a and 9a' at a distance viewed in axial direction.

The illustration according to FIG. 1 shows that the cutting plates 9, 9', 9a, and 9'a are inserted into a circumference surface 15 of the tool 1, or of the tool insert 7, respectively, in such a way that they are arranged practically tangentially.

The side view according to FIG. 1 shows that the shaft 5 is hollow in order to realize a so-called hollow shaft tension. A coolant and lubricant channel 19, which extends through the tool insert 7 and opens in the vicinity of the cutting plates 9, 9', 9a, 9'a runs coaxially from the hollow space 17 of the shaft 5 to the pivot axis 13. It is also possible to feed coolant and/or lubricant to the active blades of the cutting plates.

The greatly enlarged illustration of the end 11 of the tool 1, or the tool insert 7, respectively, as shown in FIG. 2 clearly demonstrates that also three cutting plates 9, 9' and 9", that are arranged at an equal distance to one another, and viewed in the direction of circumference, can be arranged in the circumference surface 15. The broken line indicates that the cutting plates are each penetrated by a through hole 21, which is explained merely according to the upper cutting plate 9. A tension screw—not illustrated—can be guided through this through hole 21, which retains the cutting plates at the base body of the tool 1, or of the tool insert 7, respectively. For this purpose, suitable notches 23, 23', and 23" are inserted into the circumference surface 15 in the base body of the tool 1, or of the tool insert 7, respectively. The cutting plates can also be fixed in the notches in another way, such as by means of soldering, or similar.

At an axial distance, i.e., viewed at a distance in the direction of the pivot axis 13, preferably three cutting plates are intended, as is principally obvious from FIG. 1 (see the cutting plates 9'and 9'a there). The cutting plates are each arranged on a ring surface, and—viewed in the direction of the pivot axis—arranged in a row. Generally, it is also possible to intend more than three cutting plates of this type, and to arrange them on ring surfaces, or in any desirable way. However, it has been shown that particularly with tools of a smaller diameter, an excellent support, and therefore a machining low in vibration, is given with three cutting plates per circumference range.

In the machining of cylindrical surfaces in work pieces, particularly of boring surfaces, the tool 1 can be set to rotate and inserted into a stationary work piece. It is also possible to set the work piece in rotation, and to have the tool 1 stationary. The decisive factor is a relative movement between the cutting plates and the work piece surface to be machined. The following assumes that the tool 1 rotates counter-clockwise in the machining of a boring surface, which is indicated by an arrow 25. Viewed in rotational direction, a cutting notch 27, 27', 27" is arranged in front of each cutting plate, which is inserted into the base body of the tool insert 7. The cutting notches, which are also known as the cutting area, serve for receiving the chips created in the machining of the work piece.

With the machining of the work piece, the tool 1 is shifted into the direction of its pivot axis 13. In the illustration according to FIG. 1, the tool moves from left to right, in the illustration according to FIG. 2, it moves from the drawing level toward the viewer.

The front edges of the cutting plates viewed in pivoting direction each form a cutting edge 29, 29', or 29", respectively. As FIG. 2 shows, the cutting plates are inserted into the circumference surface 15 of the tool 1 practically tangentially. Each has a first guide surface 31, 31', 31" that lags directly behind the cutting edge 29, 29', 29". Additionally, a second guide surface 33, 33', 33" is intended on each side edge of the cutting plate that is opposite of the blade 29.

Each of the cutting plates therefore supports itself with two guide surfaces, namely the first guide surface 31, 31', 31", and with the second guide surface 33, 33', 33" on the machined work piece.

FIG. 2 clearly shows that front guide surface 31 viewed in the pivot direction directly follows the blade 29, while the second guide surface 33 lags behind the first guide surface 31 at a distance. Two guide surfaces 31 and 33 are also assigned to an active blade, in this case the blade 29, which are arranged on one and the same cutting plate 9. The guide surfaces 31', 33', and 31", and 33" contribute to guiding the tool 1 into the machined bore.

The illustration according to FIG. 2 clearly shows that the first and the second guide surfaces 31, 32, also called chamfer, are arranged on a cutting plate at a distance. The guide surfaces are positioned vertically into the drawing level, and thereby are essentially parallel to the pivot axis 13 of the tool 1, or of the tool insert 7, respectively.

As the guide surfaces 31 and 33 of the cutting plate 9 each are arranged along the longitudinal edges of the cutting plate 9 that are positioned essentially parallel to the pivot axis 13, the cutting plate 9 is safely pressed into the corresponding notch 23, and supports itself on the bottom of the notch that is facing the pivot axis 13 on one hand, and on the side edge of the notch that is opposite of the active blade 29 on the other hand, so that the cutting forces caused by the machining of the bore are safely transferred into the base body of the tool 1.

The embodiment of the cutting plate is clear from the perspective illustration according to FIG. 3, which shows the cutting plate 9 again greatly enlarged:

The cutting plate 9 is constructed essentially in a rectangle shape. The illustration according to FIG. 3 shows the top 35 of the cutting plate 9 that is on the exterior. The top 35 of the cutting plate 9 is, as FIG. 2 shows, arranged so that a diameter line D that cuts the pivot axis 13 of the tool 1 is positioned vertically on the top 35. Just as the entire cutting plate 9, the top 35 is therefore inserted tangentially into the circumference surface 15 of the tool 1.

The rest of the cutting plates 9' and 9", as well as 9a, 9'a, which are arranged practically identically as the cutting plates shown in FIG. 2, are all constructed identically. For this reason, only the cutting plate 9 is explained in more detail in the following.

The front 37 of the cutting plate 9 is the side that faces the viewer in FIG. 2. Both guide surfaces, namely the first guide surface 31 and the second guide surface 33 start from it along side edges 39 and 41. The guide surfaces 31 and 33 run parallel to one another, and, as mentioned, essentially parallel to the pivot axis 13 of the tool 1 that is not illustrated here. The perspective view according to FIG. 3 shows that the guide surfaces 31 and 33 extend across the entire length of the side edges 39 and 41, and that the width of their side edges 39 and 41 measured lateral to the longitudinal direction is substantially lower than their length. The width of the guide surfaces can be adjusted to various machining requirements. The guide surfaces 31 and 33 in this example are tilted at an acute angle opposed to the top 35, and decline towards the outside in opposite directions. The tilt angle remains constant across the entire width of the guide surfaces 31 and 33. It is also possible to intend areas with various tilts across the width of the guide surfaces 31 and 33, such as a first area, which follows the side surface 39, and a second area, which adjoins the top 35. The first area can decline at a steeper angle opposite of the top 35 than the first area of the guide surface 31 that directly adjoins the top 35.

The guide surfaces 31 and 33 can also be constructed in a dome shape, as suggested in phantom line in FIG. 3, and can have a radius as is known in guide rails for reamers, for example. The radius of the guide surfaces 31 and 33 can also be chosen in a dome shape so that it is slightly smaller than the machines bore surface, or is substantially smaller than the same. The selection of the radius of the guide surfaces 31 and 33 can be adjusted to the machining requirements.

The essential part is that the tool 1 is supported in the direct vicinity of the active blade, which engages into the tool, in the area of the cutting plate 9, on one hand, and lags behind the first guide surface—viewed in pivot direction—with another guide surface.

The clearance hole 21, through which a tension screw can be fed for fixing the cutting plate 9 to the base body of the tool 1, or of the tool insert 7, respectively, opens into the top 35.

The cutting plate 9 is constructed as a reversing plate. The front left edge serves as the blade 29, also the edge diagonally opposite that forms the cutting edge 29/1. When the front left cutting edge 29 is dull, the tension screw is loosened, and the cuter plate is pivoted around the center axis of the clearance hole 21 by 180° so that the cutting edge stops at the left front, and acts as an active blade when the tool 1 is inserted.

As the cutting edge 29/1, the cutting edge 29 is constructed in that the front area of the cutting plate 9 that faces the front 37 is subjected to a grinding process. The left front part of the cutting plate 9 is ablated during this process. The cutting edge 29 is comprised of an edge area 43 near the front 37 that corresponds to an edge area 43/1 in the area of the cutting edge 29/1. The illustration according to FIG. 3 shows that the edge area 43 is enclosed with an internal limiting edge 45 of the guide surface 31 at an acute angle that opens towards the front 37 of the cutting plate 9. Preferably, it is an acute angle in the area of 10°. This means that a so-called positive grind is performed in the area of the cutting edge 29. Correspondingly, the same is true for the opposite cutting edge 29/1.

A chamfer 47 is intended at the left front edge of the cutting plate 9. This embodiment ensures that this chamfer 47 initially makes contact with the tool when the tool 1 is inserted into the bore of a work piece, until—for example, after approximately 1 mm—both guide surfaces 31 and 33 engage into the work piece surface, and therefore safely support the tool 1 in the bore to be machined.

As a whole, the course of the cutting edge 29 and of the cutting edge 29/1 is determined by the cutting line of the guide surfaces 31 and 33 with the side surfaces of the cutting plate 9. The following explains the cutting edge 29, which is constructed identically to the cutting edge 29/1, that is positioned at the left front in FIG. 3 in further detail.

A first area of the cutting edge 29 that follows the front 37 of the cutting plate 9, is formed by the cutting line of two surfaces, namely the guide surface 31 on one hand, and the chamfer 47 on the other hand. The resulting edge area 43 corresponds to the cutting line of the first guide surface 31 with a first surface section F1, which was caused by the grinding process and forms the side limitation of the cutting plate 9 here. A section 48 in a bow shape follows the edge area 43, which is formed by the cutting line of the guide surface 31 with surface section F2 caused by the grinding process, that extends into the side surface 39.

The course of the cutting edge 29/1 at the diagonally opposite upper right corner of the cutting plate 9 is point-symmetric so that the cutting plate 9 can be used as a reversing plate, i.e., so it can be pivoted 180° in case of wear of the blade 29 so that the cutting edge 29/1 that is arranged at the top right in FIG. 3 can be arranged at the bottom left.

The cutting plates that are essentially formed as a rectangle are very small. Their width between the guide surfaces 31 and 33 is, for instance, approximately 3.8 mm, and their length measured in direction of the pivot axis 13 of the tool 1 is approximately 4.0 mm.

Due to the special embodiment of the top 35 of the cutting plates, i.e., due to both guide surfaces 31 and 33, also known as the guide chamfer, it is possible to optimally guide the tool 1 in a bore that is to be machined. Due to the positive grind in the area of the cutting edge 29, or 29/1, respectively, relatively low cutting forces are produced during the machining of work pieces. Because the tool 1 is supported at each cutting plate in the area of both guide surfaces 31 and 33 after a very short machining period, namely after only approximately 1 mm insertion into the bore to be machined, vibrations in the machining of work pieces are reduced to a minimum, and generally even avoided completely. This is true especially for thin-walled assembly units, even at a cutting depth of 0.3 mm per rotation, and at a feed rate of 80 m per minute.

It is therefore possible in a simple way to create a tool 1 that ensures an optimal guidance even in the machining of extremely thin-walled assembly units. This is also true particularly when the self-stability of the tool is not very high. It is therefore possible to realize tools of the mentioned type with a diameter of 11 mm, and to achieve excellent results. This means that a machining of extremely thin-walled assembly units, even with very small tools, is also possible with extremely low vibrations so that excellent surface qualities and a very precise dimensional accuracy can be achieved.

What is claimed is:

1. A machining tool for machining bores in thin-walled work pieces, comprising:
    a tool having a circumference surface;
    a plurality of cutting plates tangentially disposed about the circumference surface of the tool, each of the cutting plates comprising two guide surfaces which are essentially parallel to one another and spaced apart from one another.

2. The machining tool according to claim 1, wherein at least one of the cutting plates comprises a first cutting edge disposed adjacent one of the guide surfaces and a second cutting edge disposed adjacent the other guide surface.

3. A method for machining bares in thin-walled work pieces, comprising:
    selecting a tool having a circumference surface;
    attaching tangentially to the circumference surface of the tool a plurality of cutting plates which each have two guide surfaces spaced apart from one another; and
    rotating the tool to machine bores in a work piece such that said two guide surfaces of each said cutting plate contacts the machined bore.

4. The method according to claim 3, wherein said cutting plates are formed with two cutting edges, the method further comprises rotating the cutting plates 180 degrees after machining one or more bores and machining additional bores.

5. A machining tool for machining bores in thin-walled work pieces, comprising:
    a tool having a rotational axis and a circumference surface formed to receive a cutting plate in tangential orientation to said circumference surface;
    at least one cutting plate sized to be received by said circumference surface and having a top surface for orientation away from said circumference surface of said tool, a central axis extending radially relative to said rotational axis of said tool and two spaced-apart guide surfaces for contacting a workpiece during machining, said two guide surfaces extending essentially along said top surface of said cutting plate perpendicular to and on either side of said central axis.

6. The machine tool according to claim 5, wherein the cutting plate is constructed as a reversing plate.

7. The machining tool according to claim 5, wherein said at least one cutting plate has a through hole formed therein for facilitating attachment of said cutting plate to said circumference surface.

8. The machining tool according to claim 5, wherein said at least one cutting plate when viewed from a top thereof, is essentially rectangular.

9. The machining tool according to claim 5, wherein said at least one cutting plate is nearly square.

10. The machining tool according to claim 5, wherein said at least one cutting plate is dimensioned to be about 3.8 mm wide and about 4.0 mm long.

11. The machining tool according to claim 5, comprising at least three cutting plates each positioned tangentially relative to the circumference surface of the tool.

12. The machining tool according to claim 11, wherein the tool further comprises an end and said circumference surface adjacent said end defines an assumed ring surface, and wherein the at least three cutting plates are attached near said end on said assumed ring surface.

13. The machining tool according to claim 12, wherein the cutting plates are spaced equidistant from one another.

14. The machining tool according to claim 5, wherein a plurality of cutting plates are attached to the tool in alignment with the rotational axis and axially spaced apart from one another.

15. The machining tool according to claim 5, wherein said two guide surfaces run essentially parallel to each other.

16. The machining tool according to claim 15, wherein the two guide surfaces, when viewed in lateral cross section, are planar along their longitudinal extension.

17. The machining tool according to claim 5, wherein said two guide surfaces run essentially parallel to said rotational axis.

18. The machining tool according to claim 5, wherein the two guide surfaces, when viewed in lateral cross section, are planar along their longitudinal extension.

19. The machining tool according to claim 5, wherein the two guide surfaces each have a longitudinal direction, and wherein each of said two guide surfaces, along the longitudinal direction thereof, have areas that contain tilt angles toward the top of the cutting plate when viewed in lateral cross section to the longitudinal direction of the guide surfaces.

20. The machining tool according to claim 5, wherein said two guide surfaces are formed along their longitudinal length with an arcuate dome shape when viewed in lateral cross section to their longitudinal extension.

21. The machining tool according to claim 5, wherein said at least one cutting plate has at least one cutting edge with a positive grind.

* * * * *